Figure 1:
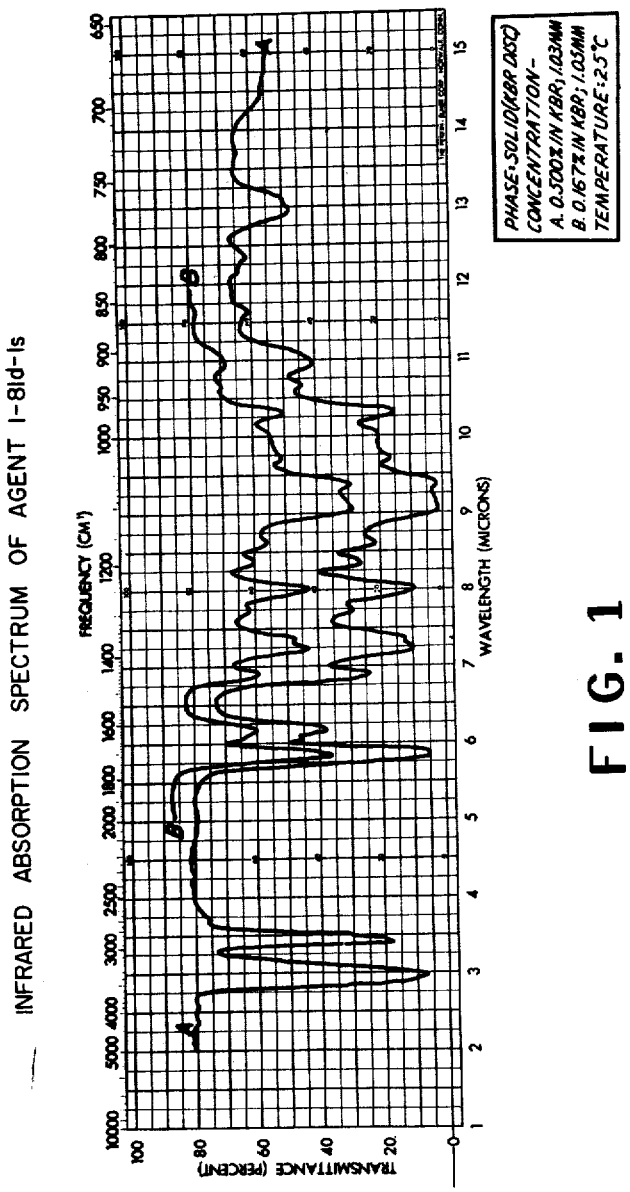

United States Patent Office 2,805,185
Patented Sept. 3, 1957

2,805,185
ANTIBIOTIC AND PRODUCTION THEREOF

Edward C. Hermann, Lester M. Larson, and William A. Price, Jr., Wilmington, Del., assignors to E. I. du Pont de Nemours and Company, Wilmington, Del., a corporation of Delaware Application May 4, 1955, Serial No. 506,034

4 Claims. (Cl. 167—65)

This invention relates to a new and useful antibiotic and to its production by fermentation of a new strain of the Actinomycete, *Streptomyces albus*, to methods for its recovery and concentration from crude solutions and to process for its purification.

The present invention includes within its scope the antibiotic in dilute forms as crude concentrates and in pure crystalline forms. These novel products are active against a variety of microorganisms including certain fungi, bacteria and viruses. The effects of the new antibiotic on specific microorganisms together with the chemical and physical properties of the antibiotic differentiate it from previously described antibiotics.

The organism producing the antibiotic of the present invention is a new strain of a species known as *Streptomyces albus*. The growth characteristics of our antibiotic-producing organism and its microscopical appearance are similar to those described in Waksman and Lechevalier's "The Actinomycetes and Their Antibiotics" for *Streptomyces albus*. The production of a dark pigment on gelatin and slow peptonization of milk indicate the strain difference. A culture of the novel strain has been deposited in the culture collection of the Northern Regional Research Laboratory, United States Department of Agriculture, Peoria, Illinois, where it has been assigned the culture number NRRL 2490.

The following growth characteristics of the organism producing the antibiotic of our invention were observed in various media after incubation at 28° C. for periods of 8 days and one month:

*Potato dextrose agar.*—Abundant spreading cream growth becoming covered with fine white cottony aerial mycelium. Surface growth becomes dirty tan, then gray. White cottony mycelium develops over the surface. Slight tan insoluble pigment.

*Czapek-sucrose agar.*—Abundant, spreading white shallow growth, becoming covered with fine white aerial mycelium. Medium very cracked at base forming fissures. No pigment. After one month mycelium still chalk-white, flat.

*Oatmeal agar.*—Abundant spreading opaque white growth, becoming covered with white powdery aerial mycelium that becomes drab grayish. Tan pigment insoluble. Surface of slant appears spotty and patched with dull gray aerial mycelium.

*Glycerol asparagine agar.*—Abundant opaque spreading growth covered with white cottony aerial mycelium. Fissures in butt of agar. After one month aerial mycelium still chalk-white. No sporulation.

*Litmus milk.*—Thick ring, gray with scant white aerial mycelium as bubbles. Ring black at upper edge. Milk slightly peptonized, alkaline. Same gray pigment. After one month milk appears black but has red cast—completely peptonized.

*Nitrate broth.*—Very slight reduction to nitrite. Pellicle of cream colonies with scant white aerial mycelium of powdery consistency. Brown pigment throughout.

*Nutrient broth.*—Thin pellicle of white growth with dull gray white surface. Brown pigment throughout.

*Dextrose asparagine agar.*—White spreading growth covered with chalk-white cottony aerial mycelium with colorless guttation droplets. Slight yellowish pigment. After one month surface appears patched with drab gray spore clumps.

*Gelatin.*—Thick tan pellicle, no aerial mycelium. Dark brown pigment about ¼ inch deep. Liquefied where pigmented. Liquefaction slow. After one month pigment about ½ inch down—liquifaction incomplete.

A culture of our antibiotic-producing strain is characterized microscopically by the spores being produced in coils—spores oval, 0.8 x 1.2 microns in diameter—tending to break away from the coil in pairs. Vegetative mycelium flexuous, 1.2 microns in diameter. Aerial mycelium 0.8–1.4 microns in diameter forming dextrose coils of 2–3 turns. Some spore chains are uncurled, 8–10 spores long.

It will be understood that for the production of the antibiotic of this invention, arbitrarily termed agent 1–81d–1s for convenience, the present invention is not limited to the aforedescribed organism or to organisms fully answering the above growth and microspical characteristics, which are given for illustrative purposes. In fact, it is desired and intended to include the use of mutants produced from the described organism by various means, such as X-radiation, ultraviolet radiation, nitrogen mustard and the like.

The cultivation of our strain of *Streptomyces albus* may take place in a variety of liquid culture media. Media which are useful for the production of agent 1–81d–1s include a source of carbon, such as sugars, glycerol, starch, corn meal, and a source of an assimilable nitrogen, such as soybean meal, corn steep liquor, hydrolyzed casein, peptone, amino acids, condensed fish solubles, and their derivatives. A source of growth factors such as distiller's solubles, yeast extract, as well as mineral salts, such as for instance, sodium chloride, calcium carbonate, potassium phosphate, magnesium sulfate and trace elements, such as iron, copper and zinc can also be utilized with desirable results.

Our preferred medium is composed of 2% corn steep liquor, 1% soy bean meal, 1% dextrose, 0.5% sodium chloride, and 0.3% calcium carbonate, the pH being adjusted to 6.5 with sodium hydroxide solution. This medium can be used for both shaken flask and tank fermentations. The antibiotic of this invention may also be produced advantageously on a medium in which the dextrose mentioned above is substituted with an equal quantity of glycerol. Other media which may be used are Emerson's medium containing 0.4% condensed fish solubles and Czapek-Dox broth containing 0.5% yeast extract.

For shaken flask fermentation 100 ml. portions of medium in 500 ml. Erlenmeyer flasks are inoculated with spore suspensions of the organism obtained from agar slants. The flasks are incubated on a shaker rotating at about 240 R. P. M., and temperature is maintained at 25–30° C., preferably at 30° C. Peak activity is found after 65–72 hours of fermentation, the culture broth at this time having a pH of 7.9–8.3.

Production of the antibiotic in tank fermenters is carried out using the same corn steep liquor medium containing dextrose as mentioned above. Each tank is inoculated with 1% of a culture broth fermented as described above for the shaker flask fermentations. Aeration is supplied at a rate of approximately 0.25–1 volume of sterile air per volume of broth per minute, and the broth is agitated by a propeller driven at about 140–270 R. P. M. Using the higher rate of agitation and the lower rate of aeration, the pH of the broth is at 7.9–8.1 after 48–50 hours of fermentation. Using the slower rate of agitation and the higher rate of aeration, pH is at 7.7–8.5 at 68–72 hours. Activity is harvested when the broth has reached a pH of about 7.9–8.4.

After fermentation is completed, the culture broth containing the antibiotic of the invention is preferably filtered to remove the mycelium from the broth. Diatomaceous earth or any of the conventional filtration aids may be used to assist the filtration which is carried out using standard equipment. Thereafter, the antibiotic may be recovered from the filtrate and also from the mycelial cake by appropriate extraction procedures. Alternatively, the whole broth may be used as is or it may be dried.

The antibiotic of this invention may be extracted from the filter cake with a lower aliphatic monohydric alcohol ($C_1$–$C_6$), such as for example, methanol, ethanol, isopropanol, or the like, or a ketone such as acetone, methyl ethyl ketone, or methyl isobutyl ketone. Of these, methanol is preferred. Roughly 70 to 95% of the total antibiotic activity is contained in the filter cake.

To extract the antibiotic from the filtrate, a water-immiscible solvent should be used. A wide variety of water-immiscible organic solvents, including ethers, aromatic hydrocarbons, esters, ketones, lower alcohols, halogenated hydrocarbons, and mixtures thereof can be employed for this extraction. Examples of these are diethyl ether, benzene, chloroform, ethyl acetate, n-butanol and methyl isobutyl ketone. Of these, ethyl acetate is preferred.

The solvent extract of the filter cake can be concentrated by distillation under reduced pressure to an aqueous slurry. The slurry may be extracted with any of the water-immiscible organic solvents mentioned in the preceding paragraph. Ether, benzene, ethyl acetate, chloroform, and n-butanol are preferred. Of these diethyl ether is particularly preferred. The activity is extracted quantitatively by the ether. The ether extract may be evaporated to give an oily residue, and the residue extracted with an aliphatic hydrocarbon solvent such as for instance, n-pentane. An active tan amorphous residue is left undissolved by the hydrocarbon solvent. This residue can be dissolved in an organic solvent such as for example, hot ethyl acetate, and after addition of an aliphatic hydrocarbon such as hexane, the solution is allowed to cool slowly to room temperature. A tan semi-crystalline product consisting essentially of agent 1–81d–1s is obtained. Yields of the tan semi-crystalline product are about 5–7 mg. per liter of culture broth.

The antibiotic of the invention may be recovered from a solvent extract of the filtrate by procedures similar to those described above for the extract of the filter cake.

Purification of the antibiotic may be obtained by recrystallization from solvent mixtures such as ethyl acetate-aliphatic hydrocarbons, dioxane-water, ethanol-water, methanol-water and chloroform-benzene. The pure antibiotic compound crystallizes from organic solvents as clusters of very small colorless needles.

Elemental analyses of agent 1–81d–1s show values of C, 63.10; H, 8.87; O, 26.48; and N, 1.92. Molecular weight 657. Empirical formula $C_{38}H_{63-65}O_{12}N$. Theoretical analysis: C, 62.81%; H, 8.81; O, 26.42; N, 1.93; M. W. 726. The product has an optical rotation of of $[\alpha]_D^{22} = -29.8°$ (1.14% solution in acetone). The product has a melting point of 140–141° C. It is stable at least up to 40° C. and also stable to air oxidation and light.

Figure 2:
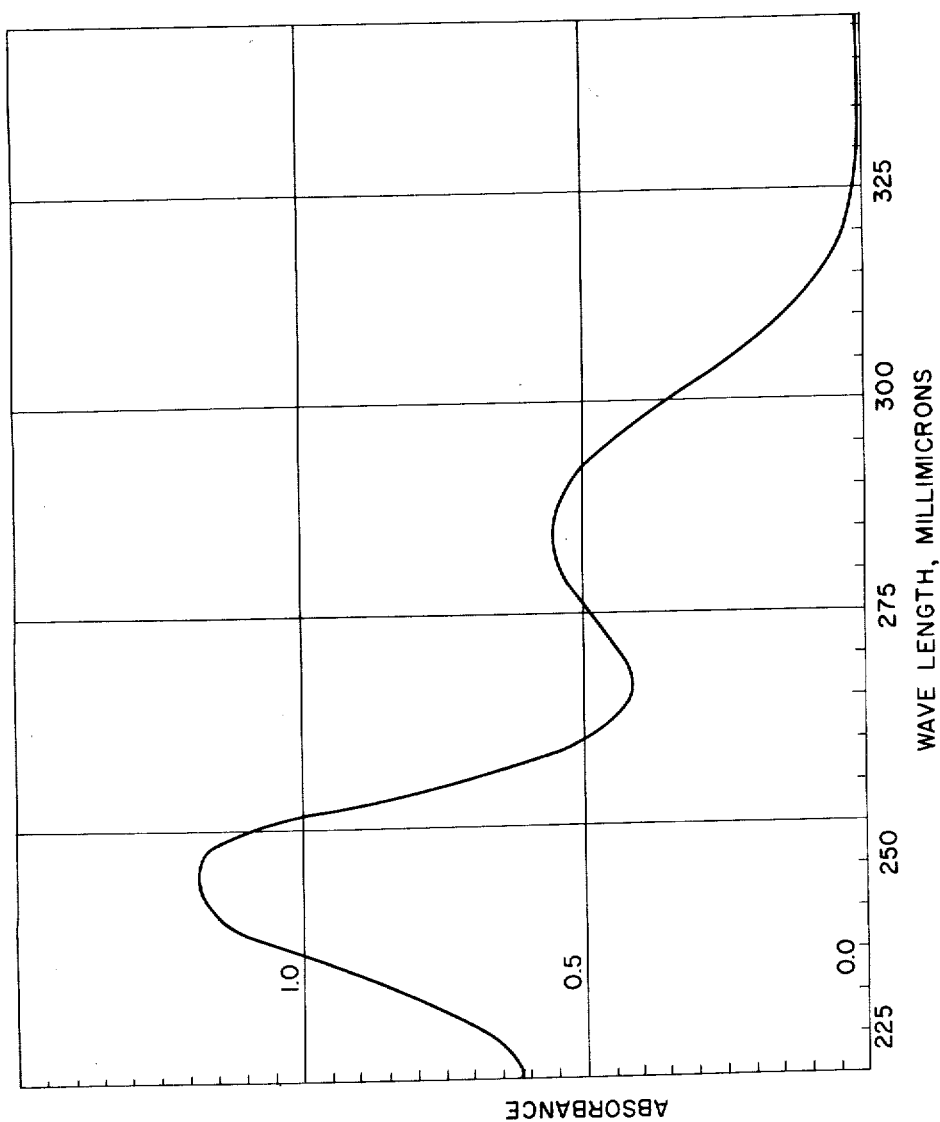

Ultraviolet spectrum analysis of agent 1–81d–1s scanned in methanol reveals the presence of two peaks. One is located at 244 m$\mu$ with an absorbency index of 52.2 (absorbency index=optical density/g./l.) and the other is found at 284 m$\mu$ with an absorbency index of 24.0. In other words, the specific extinction coefficients of the aforementioned ultraviolet absorption bands are $K_{244\ m\mu} = 52.2$ l./cm.g. and $k_{284\ m\mu} = 24.0$ l./cm.g. Both bands as can be seen by reference to Fig. 2 are reasonably sharp, but the 244 m$\mu$ band has a flat peak from 242–246 m$\mu$. Figure 2 is a graph of the ultraviolet absorption spectrum of agent 1–81d–1s in methyl alcohol at a concentration of 0.0226 gram per liter (cell length= 1 cm.). Addition of dilute alkali solution to a methanol solution of the antibiotic causes the peak at 284 m$\mu$ to shift to 274 m$\mu$. No change in absorbency occurs when compared to a methanol solution of the same concentration. Aqueous methanol and acidic aqueous methanol solutions have the same peaks and absorbencies as does a dry methanol solution.

When dissolved in chloroform and when in the solid state, the antibiotic shows a number of characteristic bands in the infrared region. From the drawing designated Fig. 1 it will be seen that the absorption band wave lengths and relative intensities for the potassium bromide scan of crystalline agent 1–81d–1s are as follows:

| λ | Relative Intensity |
|---|---|
| 2.96$\mu$ | Very strong. |
| 3.40$\mu$ | Strong. |
| 3.44$\mu$ | Medium. |
| 3.50$\mu$ | Do. |
| 5.83$\mu$ | Very strong. |
| 5.89$\mu$ | Strong. |
| 6.04$\mu$ | Weak. |
| 6.17$\mu$ | Medium. |
| 6.91$\mu$ | Strong. |
| 7.23$\mu$ | Do. |
| 7.36$\mu$ | Do. |
| 7.72$\mu$ | Medium. |
| 8.01$\mu$ | Strong. |
| 8.35$\mu$ | Medium. |
| 8.40$\mu$ | Weak. |
| 8.62$\mu$ | Medium. |
| 9.06$\mu$ | Very strong. |
| 9.19$\mu$ | Do. |
| 9.72$\mu$ | Weak. |
| 10.02$\mu$ | Do. |
| 10.32$\mu$ | Strong. |
| 10.68$\mu$ | Weak. |
| 10.96$\mu$ | Do. |
| 11.12$\mu$ | Very weak. |
| 11.65$\mu$ | Weak. |
| 12.16$\mu$ | Very weak. |
| 12.36$\mu$ | Weak. |
| 12.96$\mu$ | Medium. |
| 13.12$\mu$ | Do. |
| 13.72$\mu$ | Very weak. |
| 14.46$\mu$ | Do. |

The chloroform solution, 10.7 mg./ml., agent 1–81d–1s gave the following characteristic band (cell thickness 0.53 mm.; solvent compensated):

| λ | Relative Intensity |
|---|---|
| 2.40$\mu$ | Very weak. |
| 2.75$\mu$ | Weak. |
| 2.80$\mu$ | Very weak. |
| 2.85$\mu$ | Medium. |
| 2.95$\mu$ | Strong. |
| 3.31$\mu$ | Weak. |
| 3.40$\mu$ | Strong. |
| 3.44$\mu$ | Do. |
| 3.50$\mu$ | Weak. |
| 5.80$\mu$ | Strong. |
| 5.91$\mu$ | Do. |
| 6.05$\mu$ | Weak. |
| 6.15$\mu$ | Very weak. |
| 6.30$\mu$ | Medium. |
| 6.90$\mu$ | Do. |
| 7.22$\mu$ | Do. |
| 7.35$\mu$ | Strong. |
| 7.50$\mu$ | Medium. |
| 7.78$\mu$ | Very weak. |
| 8.00$\mu$ | Weak. |
| 8.40$\mu$ | Strong. |
| 8.60$\mu$ | Medium, broad. |
| 9.05$\mu$ | Medium. |
| 9.18$\mu$ | Very strong. |
| 9.38$\mu$ | Do. |
| 9.57$\mu$ | Weak. |
| 9.74$\mu$ | Medium. |
| 10.02$\mu$ | Weak, broad. |
| 10.31$\mu$ | Strong. |
| 10.70$\mu$ | Weak. |
| 10.92$\mu$ | Medium, broad. |
| 11.37$\mu$ | Very weak. |
| 11.74$\mu$ | Medium, broad. |

The antibiotic of our invention is soluble in lower alcohols, chloroform, ethyl acetate, dioxane, ether and acetone; is slightly soluble in benzene; and is insoluble in water and in aliphatic hydrocarbon solvents. The antibiotic is also insoluble in both cold 5% sodium hydroxide solution and cold 5% hydrochloric acid solution.

Upon heating the antibiotic with 5% sodium hydroxide solution a gas is evolved which is basic in pH as shown by wet indicator paper. The same reaction occurs upon heating the product with dry soda-lime. Our novel antibiotic dissolves in cold concentrated sulfuric acid to give a dark red coloration, and also dissolves in cold 85% phosphoric acid to give an intense lavender color. No heat is evolved in either of these cases. Potassium permanganate solution is slowly reduced by the antibiotic.

Agent 1–81d–1s is clearly distinguished from other antiobiotics by its chemical and physical properties, as evidenced by those described above, and also by its biological spectrum. While agent 1–81d–1s shows activity against a variety of microorganisms, as previously mentioned, it is particularly active against specific fungi including such pathogenic fungi as *Alternaria solani* which causes early blight of tomato plants and *Glomerella cingulata*, which causes bitter rot of apple, withertip of twigs, and anthracnose of mango and avocado. Complete control of early blight has been obtained by spraying tomato plants with a composition containing agent 1–81d–1s in a concentration of 80 parts per million or less.

The specific antifungal and antibacterial activity of the antibiotic of the invention can be noted from the following table, which shows the concentration of agent 1–81d–1s required to inhibit growth of microorganisms in broth:

TABLE

| Organism | Minimum Inhibitory Concentration, gamma/ml. |
|---|---|
| *Micrococcus pyogenes* var. *aureus* | 25 |
| *Streptococcus agalactiae* | 25 |
| *Sarcina lutea* | 6.3 |
| *Bacillus anthracis* | 25 |
| *Streptococcus pyogenes* | 12.5 |
| *Diplococcus pneumoniae* | 6.3 |
| *Mycobacterium tuberculosis* 607 | 50 |
| *Mycobacterium phlei* | 50 |
| *Glomerella cingulata* | 12.5 |
| *Helminthosporium catenarium* | 3.1 |
| *Paecilomyces variota* | 1.6 |
| *Penicillium citrinium* | 3.1 |
| *Scopulariopsis brevicaulis* | 3.1 |
| *Mycoderma lipolytica* | 6.3 |
| *Rhodotorula sp.* | 0.2 |
| *Saccharomyces pastorianus* | <0.1 |
| *Zygosaccharomyces japonicus* | <0.1 |
| *Herpetomonas culicidarum* | 3.1 |

Agent 1–81d–1s is inactive against the following organisms, that is, the minimum inhibitory concentration is greater than 50 gammas per ml.

*Aerobacter aerogenes*
*Bacillus subtilis*
*Escherichia coli*
*Klebsiella pneumoniae* A
*Klebsiella pneumoniae* B
*Clostridium sporogenes*
*Proteus vulgaris*
*Pseudomonas aeruginosa*
*Salmonella gallinarum*
*Salmonella pullorum*
*Salmonella typhimurium*
*Neisseria catarrhalis*
*Salmonella paratyphi*
*Shigella dysenteriae*
*Brucella abortus*
*Aspergillus fumigatus*
*Aspergillus niger*
*Metarrhizium glutinarium*
*Ustilago avenae*
*Streptomyces griseus*
*Candida albicans*
*Dubaryomyces sp.*
*Nemotospora sp.*
*Saccharomyces cerevisiae*
*Torulopsis utilis*

It is apparent from the above table and list that the activity of the antibiotic of the present invention is highly specific against fungi. Agent 1–81d–1s is highly active against *Saccharomyces pastorianus* (a contaminant in breweries which causes musty and other off flavors in beer) and relatively inactive against a closely related yeast, namely, *Saccharomyces cerevisiae*. Furthermore, the results indicate that the antibiotic is highly active as an anti-fungal agent and consequently useful against *Helminthosporium catenarium* (this genus is involved in a large number of root and foot-rot diseases of cereal plants causing large losses in wheat, barley and corn crops), *Paecilomyces variota* and *Penicillium citrinium* (both of these microorganisms are involved in rots of stored products and on fruits and vegetables), *Scopulariopsis brevicaulis* (this species is involved in the spoilage of various products including fruit, cabbage and turnips and in the production of off flavors in cheese and other dairy products, and *Mycoderma lipolytica*, which causes spoilage of fat products. As an antibacterial agent, the antibiotic is highly active against *Sarcina lutea* and *Diplococcus pneumoniae*.

The antibiotic of our invention is also active against the virus influenza PR8 in tissue tests utilizing the chlorioallantoic membranes of chicken egg embryos. The activity appears to be intracellular in action since no inactivation of the free virus occurs. Agent 1–81d–1s has not yet been demonstrated to be useful in human therapy.

The invention is further illustrated by the following examples:

*Example 1.—Fermentation in shaker flasks*

A sterile liquid medium composed of 2% corn steep liquor, 1% soy bean meal, 1% dextrose, 0.5% sodium chloride, and 0.3% calcium carbonate, pH being adjusted to 6.5, is used in 100 ml. portions in 500 ml. Erlenmeyer flasks plugged with cotton. Each of 5 flasks is inoculated with 1% of a spore suspension of our new strain of *Streptomyces albus* obtained from a Conn's agar slant. Incubation is carried out on a shaker rotating at 240 R. P. M. in a constant temperature room at 30° C. After 65 hours, the pH of the fermentation broth is 8.0, and the activity is harvested.

*Example 2.—Fermentation in 50-gallon fermenter*

A 25-gallon batch of corn steep liquor medium, as described in Example 1, in a 50-gallon stainless steel tank fermenter is inoculated with 1% of a 96-hour culture of the new strain of *Streptomyces albus* prepared by shaker flask fermentation. The culture broth is aerated at a rate of about 0.25 volume of sterile air per minute and is agitated by a propeller driven at 270 R. P. M. After 50 hours, pH of the broth is 7.9, and activity is harvested.

*Example 3.—Isolation from broth fermented in 50-gallon fermenters*

A 50-gallon batch of fermented broth is filtered using a diatomaceous earth filtration aid. The filtrate is discarded. The filter cake is washed batch-wise with 15 gallons of water, and the aqueous wash is discarded. The filter cake is then extracted twice with 10-gallon portions of methyl alcohol. The combined methanol extracts are concentrated at room temperature under reduced pressure in a still to about 4 liters in volume. The 4 liters of methanol concentrate are further concentrated in a still under reduced pressure at a temperature not exceeding 25° C. to a volume of 1600 ml. To this there is added 2000 ml. of water. The water and concentrates are thoroughly mixed. The mixture is extracted four times with equal volumes of ether. The combined ether extracts are evaporated to give a dark amber oil.

The oil is washed with 300 ml. of n-pentane, a precipitate forming which is removed by filtration. This precipitate is washed with 100 ml. of n-pentane. The tan amorphous residue remaining weighs 2.8 grams. The combined pentane washings contain a component which inactivates the free influenza virus as shown in a chick embryo test in eggs.

The tan amorphous residue is dissolved in 15 ml. of hot ethyl acetate, and 30 ml. of n-hexane are added. A gummy, dark amber precipitate forms, and the supernatant is decanted and allowed to cool slowly to room temperature. A tan semi-crystalline precipitate is formed, which is filtered off, washed with ethyl acetate-hexane 1:4, and air-dried.

A yield of 1.13 grams of tan product consisting essentially of agent 1–8ld–1s is obtained, M. P. 137–140° C. A 260 mg. portion of this product is dissolved in 2.5 ml. of hot ethyl acetate, and 5 ml. of n-hexane are added. The solution is filtered to remove some amber-colored solids, and the filtrate is then cooled slowly to room temperature. Clusters of minute needles precipitate from the solution. The product is filtered off, washed in ethyl acetate-hexane 1:4 and air-dried. A yield of 180 mg. of colorless product, agent 1–8ld–1s, is obtained having a melting point of 139–140° C. Repeated recrystallization from the same solvent system produced a product having a melting point of 140–141° C. The chemical analysis of this product and its other chemical, physical, and biological properties have already been described.

We claim:

1. A process for the production of agent 1–81d–1s which comprises cultivating *Streptomyces albus* NRRL 2490 under agitated submerged aerobic conditions in an aqueous nutrient medium containing as a source of carbon at least one member of the group consisting of sugars, glycerol, starch, and corn meal; as a source of assimilable nitrogen a member of the group consisting of soybean meal, corn steep liquor, hydrolyzed casein, peptone, amino acids and condensed fish solubles and mineral salts; for a period of from about 2 days to about 4 days and at a temperature of from about 25° to about 30° C.

2. A substance effective in inhibiting the growth of certain fungi, bacteria and viruses; said substance being soluble in lower alcohols, chloroform, ethyl acetate, dioxane, ether and acetone; slightly soluble in benzene, and insoluble in water and in aliphatic hydrocarbon solvents; said substance containing the elements carbon, hydrogen, oxygen and nitrogen in substantially the following proportions by weight:

| | |
|---|---|
| Carbon | 63.10 |
| Hydrogen | 8.87 |
| Nitrogen | 1.92 |
| Oxygen | 26.48 |

Molecular weight 657; empirical formula $C_{38}H_{63-65}O_{12}N$; said substance being further characterized by having the optical rotation $[\alpha]_D^{22} = -29.8°$ (1.14% solution in acetone), a melting point of 140–141° C., two peaks at 244 $\mu$ and 284 $\mu$, respectively in the ultraviolet region of the spectrum; when dissolved in chloroform exhibits characteristic absorption in the infrared region at the following wave lengths expressed in microns: 2.75, 2.85, 2.95, 3.31, 3.40, 3.44, 3.50, 5.80, 5.91, 6.05, 6.30, 6.60, 6.90, 7.22, 7.35, 7.78, 8.00, 8.40, 8.60, 9.05, 9.18, 9.38, 9.57, 9.74, 10.02, 10.31, 10.70, 10.92, 11.74; said substance dissolves without evolution of heat in cold concentrated sulfuric acid to give a dark red coloration and in cold 85% phosphoric acid to give an intense lavender color.

3. The process of claim 1 wherein the medium is composed of 2% corn steep liquor, 1% soy bean meal, 1% dextrose, 0.5% sodium chloride, and 0.3% calcium carbonate, the pH of said medium being adjusted to 6.5 with sodium hydroxide solution.

4. A process for producing agent 1–81d–1s which comprises cultivating *Streptomyces albus* NRRL 2490 in an aqueous nutrient medium containing a carbohydrate as a carbon source, an organic source of nitrogen and nutrient salts under aerobic conditions until substantial antimicrobial activity is imparted to said medium.

References Cited in the file of this patent

UNITED STATES PATENTS 2,691,618 Tanner et al. ------------ Oct. 12, 1954

OTHER REFERENCES

Waksman et al.: The Actinomycetes and Their Antibiotics, pub. 1953 by Williams and Wilkins, Baltimore, Md., pp. 38–41, 49, 57, 58, 83, 84, 85, 170–172, 175, 176–177, 180, 183, 184.

Sobin et al.: Article in Antibiotics Annual 1954–55, pp. 827–830, publ. February 1955. Abstract on article pub. October 25–29, 1954, abstract is one page.

Martin et al.: Antiobiotics Annual 1954–55, pp. 1020–1024, pub. 1955 by Med. Ency. Co., N. Y. C.

UNITED STATES PATENT OFFICE

CERTIFICATE OF CORRECTION

Patent No. 2,805,185 September 3, 1957

Edward C. Hermann et al.

It is hereby certified that error appears in the printed specification of the above numbered patent requiring correction and that the said Letters Patent should read as corrected below.

Column 1, line 16, for "process" read -- processes --; column 8, line 8, for "244 µµ" read -- 244 mµ --; line 9, for "284 µµ " read -- 284 mµ --.

Signed and sealed this 19th day of November 1957.

(SEAL)
Attest:

KARL H. AXLINE
Attesting Officer

ROBERT C. WATSON
Commissioner of Patents